United States Patent [19]
Allard

[11] Patent Number: 5,374,157
[45] Date of Patent: Dec. 20, 1994

[54] APPARATUS FOR MOVING SAWLOGS OR TREE STEMS BETWEEN STATIONS

[75] Inventor: Benoit Allard, Chicoutimi-Nord, Canada

[73] Assignee: Les Ateliers Benoit Allard, Inc., Quebec, Canada

[21] Appl. No.: 119,747

[22] Filed: Sep. 10, 1993

[51] Int. Cl.⁵ .................................................. B65G 25/08
[52] U.S. Cl. ........................... 414/746.6; 198/774.3; 198/775
[58] Field of Search .............. 198/774.3, 775, 613, 198/776, 777, 775; 414/745.9, 746.1, 746.4, 745.1, 746.6

[56] References Cited

U.S. PATENT DOCUMENTS

| | | | |
|---|---|---|---|
| 2,327,734 | 8/1943 | Morgan | 198/774.3 |
| 3,130,830 | 4/1964 | Allbeson | |
| 3,203,430 | 8/1965 | Lorenzen et al. | 198/776 X |
| 3,712,458 | 1/1973 | Elineau | 198/776 |
| 4,585,114 | 4/1986 | Liliano | 198/570 |
| 5,086,912 | 2/1992 | Howden, Jr. | 198/774.3 X |
| 5,174,351 | 12/1992 | Lindenblatt et al. | 414/746.4 X |

*Primary Examiner*—Michael S. Huppert
*Assistant Examiner*—Janice L. Krizek
*Attorney, Agent, or Firm*—Iandiorio & Teska

[57] ABSTRACT

The disclosure describes an apparatus to move, individually and at a controlled rate, sawlogs and tree stems from a first multiple feeding station to a second station situated at a higher level than that of the first station; it comprises a frame and two sets of movable plates, both extending in parallel vertical planes. A system of levers is connected to the two sets of movable plates so as to serve as support and to supply them with a trajectory defining an arc of a circle. A rotary motor, a drive lever and a link cooperate to provide this trajectory with a sinusoidal-type acceleration.

7 Claims, 4 Drawing Sheets

APPARATUS FOR MOVING SAWLOGS OR TREE STEMS BETWEEN STATIONS

FIELD OF THE INVENTION

The present invention relates to an apparatus for moving individually and at a controlled rate sawlogs or tree stems from a first multiple feeding station to a second receiving station that feeds a classification or transformation system.

Apparatuses of this type are known in forestry under the name "unscramblers" and are described, for example, in British patent no. 1,256,509 published Dec. 8, 1971 to Wellman-Cranes Ltd., in Canadian patent no. 1,277,682 issued Dec. 11, 1990 to Interlog AB as well as in my copending Canadian application serial No. 2,074,645 filed Jul. 24, 1992.

In the British patent, there is described a system in which elements of cylindrical shape are moved from a first station to a second station, but in a same horizontal plane. The apparatus is composed of a set of fixed plates and a set of movable plates, both sets cooperating to displace the elements from the first station to the second station.

In the Canadian patent, there is described an apparatus of the same type, using a combination of fixed and movable plates, but wherein an inclination exists between the feeding station and the receiving station and wherein the movement of the movable plates is rectilinear.

These two systems utilize, for the displacement of the transported elements, a movement of the set of movable plates obtained with the aid of hydraulic jacks. In the cases of displacement of logs having irregular shapes, the dynamic reactions, due to shocks created by the stroke reversal of hydraulic jacks used in systems of this type, result in certain logs being unstable at their equilibrium point and produce a negative effect on the efficiency of the apparatus, especially at high operating speeds.

OBJECTS AND STATEMENT OF THE INVENTION

An object of the present invention is to overcome the problems associated with such apparatuses. This object is achieved by applying to both movable plates a trajectory describing an arc of a circle and subjected to a sinusoidal-type acceleration. There results a full control of the trajectory, of the acceleration and of the speed for all travelling points of both sets of plates which are responsible for the displacement and the separation of the logs, insuring at the same time an operational parallelism of the two moving systems. The mechanical concept of the present invention equally enables the variation and the precise adjustment of the rate of displacement of the plates, thereby ensuring a fully synchronized feed with the manufacturing process and reducing free space between the transported elements.

An additional advantage consists in making possible higher displacement rates, thereby increasing the feeding capacity of the process, due to the gradual accelerations generated by the rotary prime mover which avoid the shocks of sudden path reversal.

The present invention therefore refers to an apparatus used in moving sawlogs or tree stems from a first multiple feeding station to a second receiving station which is elevated with respect to the first station, comprising:

a frame;

two sets of movable plates spaced parallel to one another, the movable plates having, along their upper edge, a shape adapted for displacing or retaining logs and stems;

movable support means connecting both sets of movable plates to the frame and being adapted, when moving, to provide the two sets of movable plates with opposite trajectories each corresponding to an arc of a circle, and driving means, mounted on the frame and associated with the support means, adapted to provide the trajectories of the movable plates with a sinusoidal acceleration.

According to a preferred form of the invention, the support means consist of levers having one extremity connected to the set of movable plates and an opposite extremity pivoted to the frame, and joined to the adjacent lever by a pair of meshing gear segments. According to this preferred form, the driving means comprise a rotary motor and gear reducer, a drive lever and rod means connected to one set of movable plates.

According to another preferred form, the driving means comprises a rotary power unit coupled to a speed reducer having a double ended output shaft, on each end of which is mounted a drive lever with rod means, each connected to one of the moving sets of plates, the manner of mounting the levers on the shaft providing a 180° out-of-phase displacement of the moving plate sets.

The present system operates with inclination angles greater than those of existing systems, i.e., 35° or more, under certain conditions of log diameter, which can satisfy in most cases the operational requirements in concerned industries.

Furthermore, an improvement in parallelism of the transported logs or stems is obtained by the higher inclination angle of the components facing the initial feeding from any mixed piling occurring on the incoming transfer deck.

This higher inclination angle and the application of a gradual acceleration in all of the displacement faces of the movable plates allow a more constant separation of the transported elements, the gradual acceleration eliminating the shocks which would be present if hydraulic jacks were used as driving means such as described in the above British and Canadian patents.

Another feature of the present invention resides in the double acting characteristic provided by the use of two sets of vertical plates which are moving parallelly in opposite directions, under the impulsion of a single motive unit of rotative type, thereby causing the transfer of the transported pieces from one set of plates to the other, at the meeting point of the carrying faces of the ascending plates with the receiving faces of the descending plates, the synchronism in the reciprocating movement of the two sets of plates being accomplished by engaging gear segments between the lower rotating axes of the levers; some other means may also be devised for this function.

This method reduces by half the distance travelled by the moving plates in each cycle, and similarly their required speed of displacement in comparison to systems utilizing one set of moving plates working in conjunction with one set of fixed plates. The lower speed required to reach the same frequency of log transfer as in the comparative systems, therefore leads to the possibility of increasing the said frequency and therefore the work capacity of the unit.

Another characteristic of the double action system consists of a notable reduction in energy (of the order of 40%), compared to the requirements of a single moving plate system, due to the self-cancelling inertial forces of the two groups of plates reversing simultaneously from opposite directions of travel, within the same power system.

A further result of reducing by this same method the unbalanced portion of said inertial forces, is to reduce also the overall system vibration level, thus protecting mechanical and structural components from early fatigue failure.

The present invention further provides safety in the mechanical operation by the elimination of lateral guides and rolling paths of the movable plates which are vulnerable to the falling of debris, such as bark, branches, fragments, etc.

Other features and advantages of the invention will be deduced from the description that follows with respect to the annexed drawings which are given as non-limiting example.

IN THE DRAWINGS

FIG. 1 is a perspective view of an apparatus according to the present invention;

FIG. 2 is an elevational view illustrating the sets of movable plates in one position of log displacement;

FIG. 3 is an elevational view illustrating the sets of movable plates in a second position; and FIG. 4 is a rear elevational view thereof.

Figure 1:
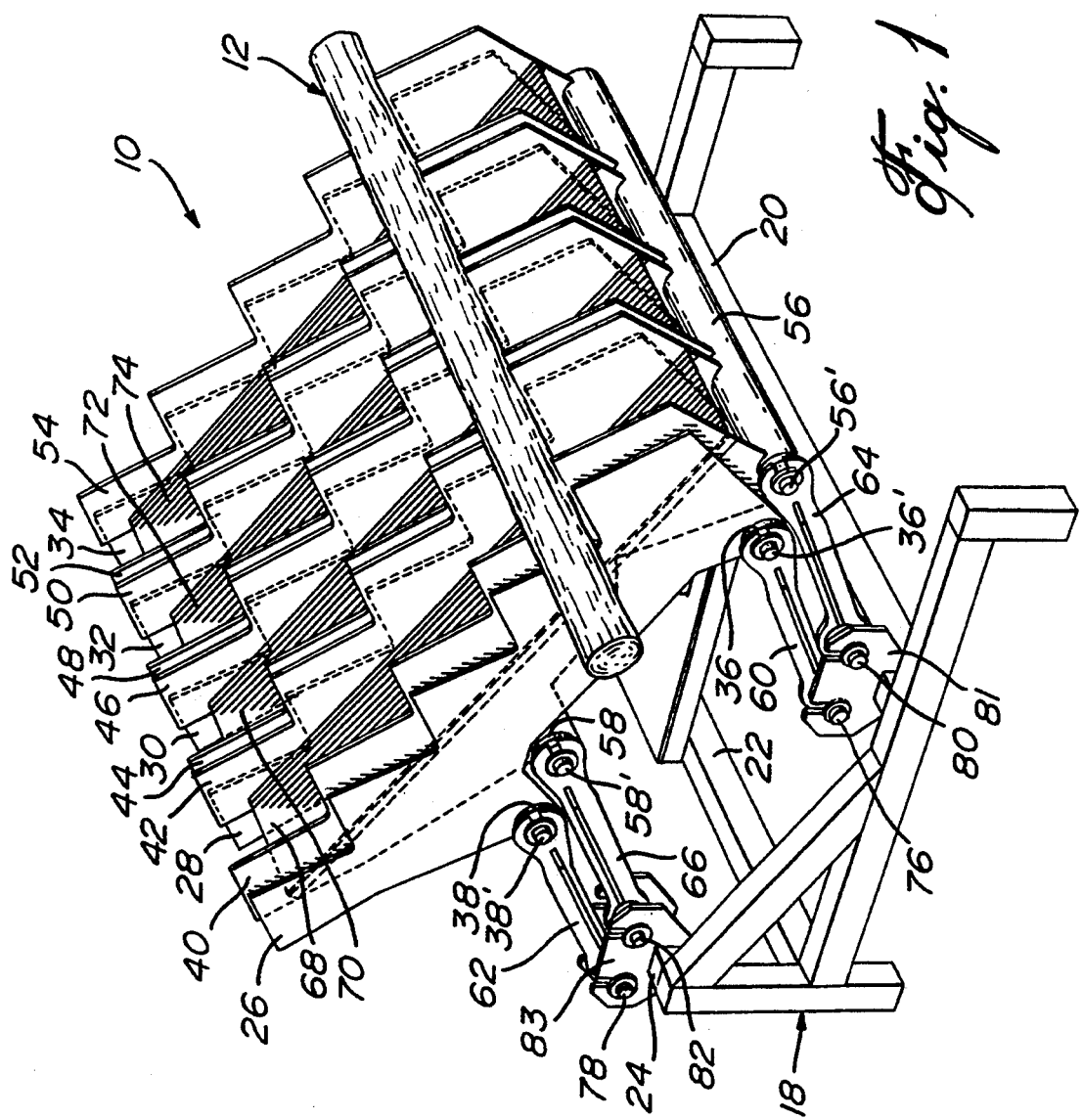
Referring to FIG. 1, the apparatus, generally designated 10, serves to move logs 12 or tree stems from a first feeding station 14 to a second receiving station 16 which feeds a classification or transformation system. The first station is at a level lower than that of the receiving station as illustrated in FIG. 2.

The apparatus comprises a frame 18 composed of vertical and horizontal supports interconnected by means of cross-members 20, 22 and 24.

Two sets of movable plates all parallel to one another extend along an upward slope from the first station to the second station. A first set includes, in the embodiment illustrated, parallel vertical plates 26, 28, 30, 32 and 34 each having its lower extremity fixed to a lower transverse tubular beam 36 and its upper extremity fixed to an upper transverse tubular beam 38. A second set includes parallel vertical plates arranged in pairs 40-42, 44-46, 48-50 and 52-54, each plate having its lower extremity fixed to a lower transverse tubular beam 56 and its upper extremity fixed to an upper transverse tubular beam 58. These beams are pivotal about a respective axis 36', 38', 56', 58' and are joined to the frame through carrying respective levers 60, 62, 64, 66.

The upper profile of these plates defines a generally upward inclination angle from the first station to the discharge station and also provides carrying pockets to move the logs towards the receiving station.

The first set of moving plates is fixedly mounted individually onto the carrying beams 36, 38 while, in the second set, the plates are joined in pairs by a series of intermediate plane surfaces 68, 70, 72 and 74, allowing sliding of debris thereon, said plates of the second set being mounted fixedly onto carrying beams 56 and 58.

The lower end of each of the levers 60, 62, 64, 66 is pivotally mounted at 76, 78, 80 and 82 onto lateral support plates 81 and 83. Levers 60 and 64 are joined by a pair of meshing gear segments 84, 86 (see FIG. 2) while levers 62 and 66 are joined by a pair of meshing gear segments 88 and 90 to impart equal and opposite motion to the matching sets of moving plates.

Figure 3:
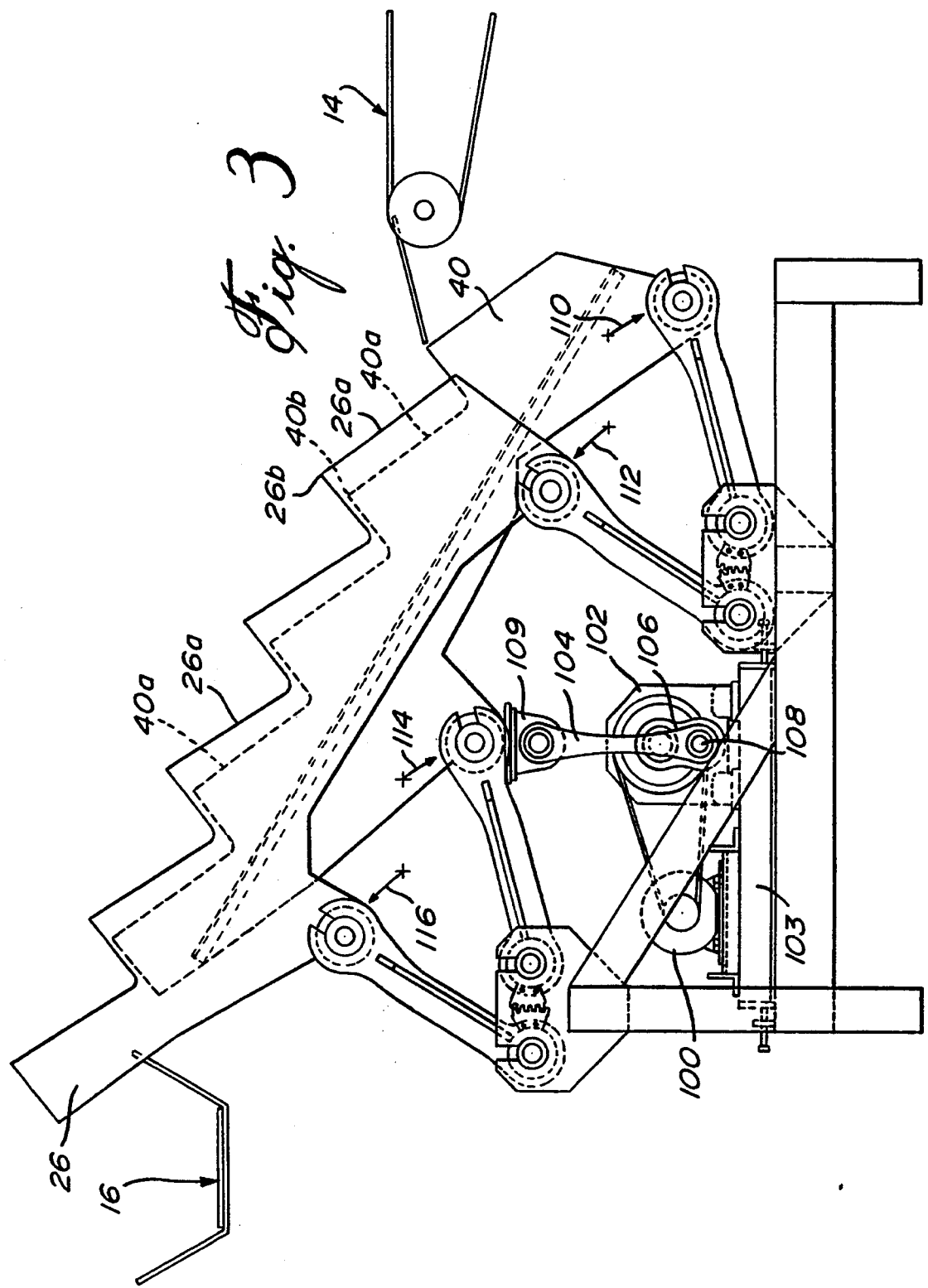
Figure 4:
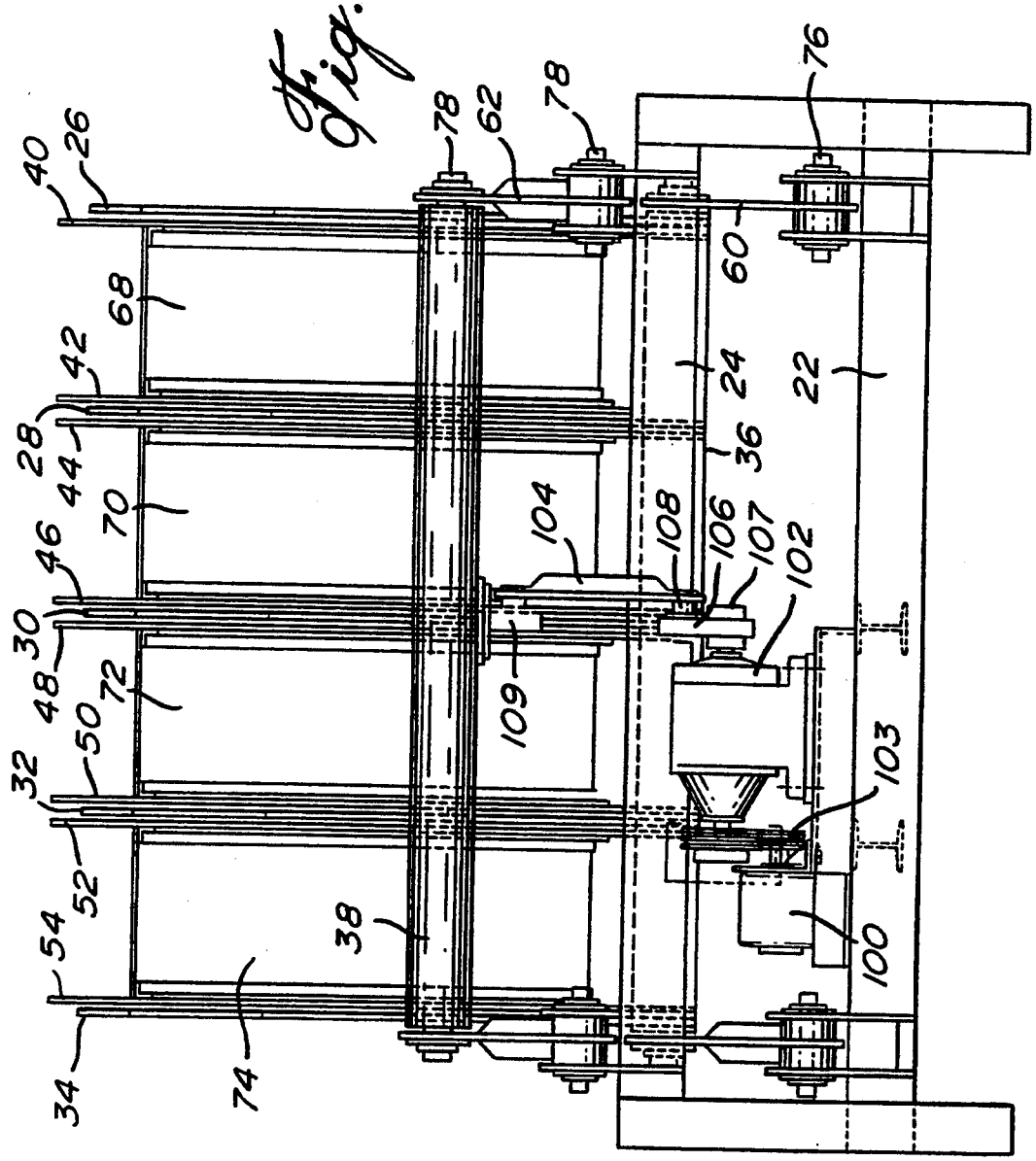

Referring to FIGS. 3 and 4, an assembly comprising a motor 100, preferably equipped with a speed reducer 102 of the gear type, is fixed onto a lower platform 103 of the frame. A rod 104 is connected to the reducer by means of a drive lever 106 having one extremity fixed to the output shaft 107 of the reducer and the opposite extremity to the rod at pivot axis 108. Rod 104 is pivotally mounted to a bracket member 109 secured to the lower part of the set of plates 46 and 48. The driving may be accomplished hydraulically, provided however, that the movement of the output shaft is rotary.

Figure 2:
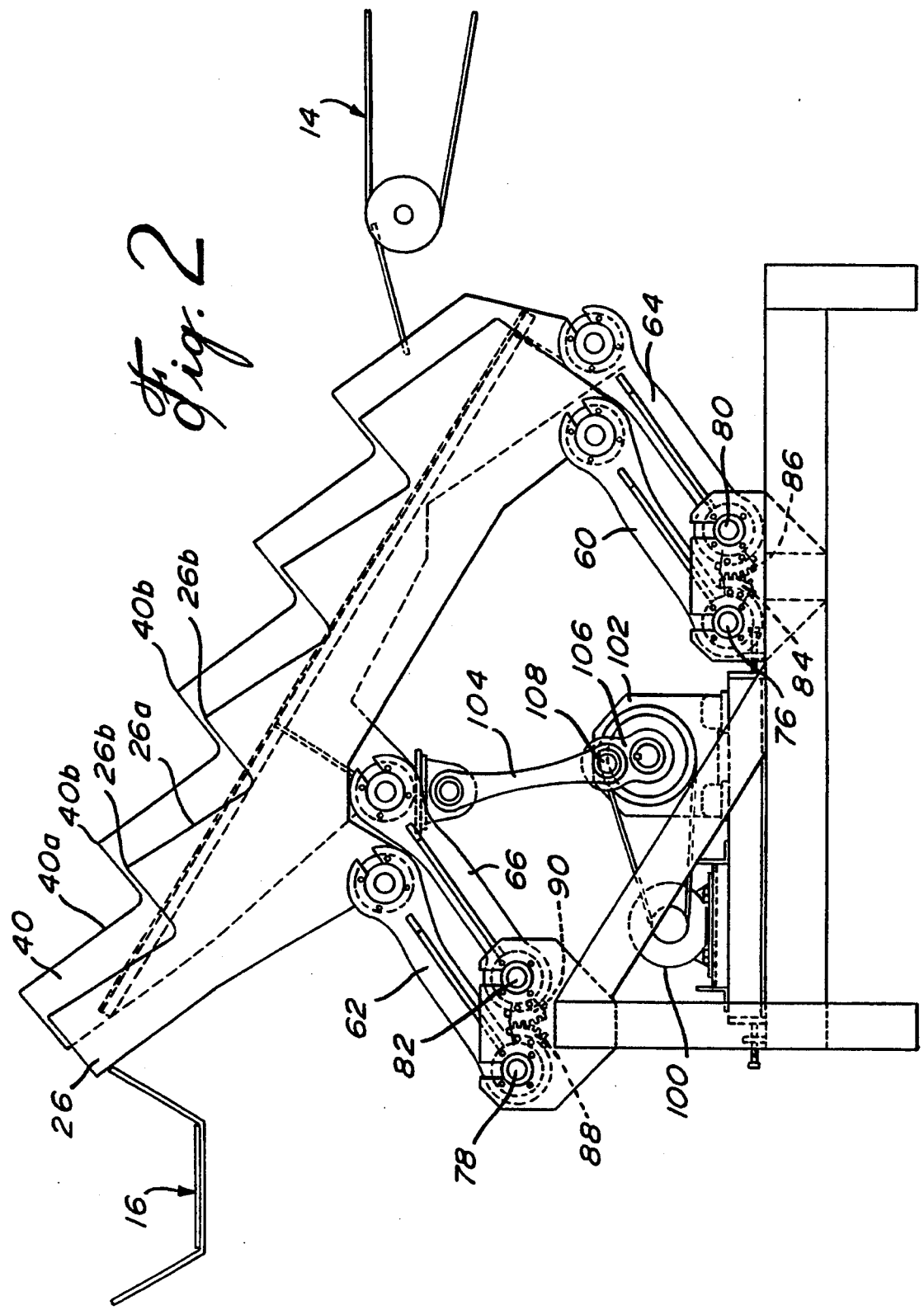

A description of the operating system will now be given with reference to FIGS. 2 and 3. At the beginning of each operating cycle, in the lower part of the system, the lever 106 is displaced from its lowest point as indicated in FIG. 3 and, through link 104, the lever gradually accelerates the mass of each set of movable plates in the ascending and descending directions respectively, along an arc of a circle, as illustrated by arrows 110, 112, 114, 116 and defined by the displacement of the pivoting points of the carrying levers with the transverse members. This displacement brings faces 26a, 28a, etc., of one set of movable plates 26, 28, etc., in contact with the logs or stems, and moves them upwards to meet the descending faces 40a, 42a, etc., of the oppositely travelling plates 40, 42, etc., which then reverse direction and carry them further to the next step where the operation is repeated until final discharge of the logs into the receiving station 16.

The separation process of the logs occurs twice during a complete cycle:

a) in the ascending movement of the logs, when summits 26b, 28b, etc., and 40b, 42b, etc., are adjacent to one another in their respective uppermost and lowermost part of travel, and b) in cases where two logs, or more, reach a transfer point; the displacement along an arc of a circle, which is repeated on the return of the descending plates then causes the excess logs to be raised beyond faces 26a, 28a, etc., and to drop rearwardly above point 40b, 42b, etc., to be again placed in the preceding ascending stage. The analysis of the passage of the logs from the initial receiving level until the following transfer level applies to all subsequent stages until the final discharging of the logs at the upper part of the apparatus.

Thus, the support and drive means of the movable plates, in addition to permitting an ascending angle equal to or greater than 35°, provide also a higher flow of elements at a higher rate and operational speed, without mechanical inconveniences, due both to shockless reversals and acceleration and also to the fact that lower displacement speeds are required because of the elimination of the retention time required by other systems in stationary receiving stations between each cycle. Therefore, the concept of mounting the movable plates on oscillating levers ensures a positive control of the trajectory of these plates for every ascending angle and operational speed. Furthermore, the drive means provide a gradual acceleration in both directions of movement, for all operational speeds, thereby avoiding impact on the logs and the dynamic reactions which result therefrom in systems utilizing hydraulic jacks.

Although the invention has been described with respect to a preferred mode, it is evident that it may be modified and refined in various ways. It is therefore wished that the scope of protection to be given to the present invention should only be limited by the scope of the accompanying claims.

We claim:

1. An apparatus for moving sawlogs or tree stems from a first multiple feeding station to a second receiving station which is elevated with respect to the first station, comprising:

a frame;

two sets of movable plates mounted on said frame, said plates being parallel to one another and inclined upwards from said first station to said second station; each of said plates having along its upper edge, a shape adapted to receive and propel logs or stems;

movable support means connecting the sets of movable plates to said frame and providing when moving, the sets of movable plates with a reciprocating trajectory along an arc of a circle, and driving means, mounted on said frame and associated with said support means, for imparting a sinusoidal acceleration to said plates as they move along said trajectory, said driving means including means to insure synchronized opposite displacement of one set of movable plates relative to the other set of movable plates.

2. An apparatus as defined in claim 1, wherein said support means includes lever means having one end pivotally connected to said two sets of movable plates and an opposite end rotatably supported on said frame; said synchronizing means comprising intermeshing gear means at said opposite end for transmitting equal and opposite rotation from a lever means associated with one set of movable plates to a lever means supporting the other set of movable plates.

3. An apparatus as defined in claim 2, wherein said lever means consist of two sets of levers pivotally connected to the opposite sides of a respective one of said two sets of movable plates, each lever of a set of levers having a gear segment at the opposite end in intermeshing engagement with a corresponding gear segment of an adjacently disposed lever.

4. An apparatus as defined in claim 1, wherein said driving means include a rotary motor and gear reducer, drive lever means associated with said reducer, link means having one end connected to said drive lever means and an opposite end connected to one of said sets of movable plates; said link means imparting a reciprocating motion along the arc of a circle to one set of movable plates; said reciprocating motion being transmitted to the second set of movable plates through pairs of intermeshing gear segments.

5. An apparatus as defined in claim 1, wherein an upper profile of said two sets of movable plates has an overall upward inclination angle of about 35°.

6. An apparatus for moving sawlogs or tree stems from a first multiple feeding station to a second receiving station which is elevated with respect to the first station, comprising:

a frame;

two sets of movable plates mounted on said frame, said plates being parallel to one another and inclined upwards from said first station to said second station; each of said plates having along its upper edge, a shape adapted to receive and propel logs or stems;

movable support means connecting the sets of movable plates to said frame and providing, when moving, the sets of movable plates with a reciprocating trajectory along an arc of a circle, and driving means, mounted on said frame and associated with said support means, for imparting a sinusoidal acceleration to said plates as they move along said trajectory, said driving means including means to insure synchronized opposite displacement of one set of movable plates relative to the other set of movable plates;

wherein said support means includes lever means having one end pivotally connected to said two sets of movable plates and an opposite end rotatably supported on said frame; said synchronizing means comprising intermeshing gear means at said opposite end for transmitting equal and opposite rotation from a lever means associated with one set of movable plates to a lever means supporting the other set of movable plates.

7. The apparatus as defined in claim 6, wherein said lever means consist of two sets of levers pivotally connected to the opposite sides of a respective one of said two sets of movable plates, each lever of a set of levers having a gear segment at the opposite end in intermeshing engagement with a corresponding gear segment of an adjacently disposed lever.

* * * * *